US012738638B2

(12) United States Patent
Yan et al.

(10) Patent No.: US 12,738,638 B2
(45) Date of Patent: Sep. 15, 2026

(54) ANTENNA ASSEMBLY AND MOBILE TERMINAL

(71) Applicant: JRD COMMUNICATION (SHENZHEN) LTD., Shenzhen (CN)

(72) Inventors: Yongyi Yan, Shenzhen (CN); Xinrong An, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 184 days.

(21) Appl. No.: 18/254,860

(22) PCT Filed: Dec. 10, 2020

(86) PCT No.: PCT/CN2020/135454
§ 371 (c)(1),
(2) Date: May 28, 2023

(87) PCT Pub. No.: WO2022/110316
PCT Pub. Date: Jun. 2, 2022

(65) Prior Publication Data
US 2024/0006752 A1 Jan. 4, 2024

(30) Foreign Application Priority Data
Nov. 27, 2020 (CN) ......................... 202011364945.3

(51) Int. Cl.
*H01Q 1/42* (2006.01)
*H01Q 1/22* (2006.01)
*H01Q 1/38* (2006.01)

(52) U.S. Cl.
CPC ................. *H01Q 1/42* (2013.01); *H01Q 1/22* (2013.01); *H01Q 1/38* (2013.01)

(58) Field of Classification Search
CPC .. H01Q 1/42; H01Q 1/22; H01Q 1/38; H01Q 1/243; H01Q 5/328
See application file for complete search history.

(56) References Cited

U.S. PATENT DOCUMENTS

2017/0346159 A1 11/2017 Xue et al.
2018/0342794 A1* 11/2018 Han ......................... H04B 1/18
(Continued)

FOREIGN PATENT DOCUMENTS

CN 104300215 A 1/2015
CN 204189957 U 3/2015
(Continued)

OTHER PUBLICATIONS

International Search Report in International application No. PCT/CN2020/135454,mailed on Jul. 27, 2021.
(Continued)

*Primary Examiner* — Seokjin Kim
(74) *Attorney, Agent, or Firm* — PV IP PC; Wei Te Chung

(57) ABSTRACT

Disclosed are an antenna assembly and a mobile terminal. The antenna assembly comprises a metal frame, a matching circuit, an antenna wiring and a tuning module. The metal frame is provided with a feed point, and the matching circuit is connected to the feed point on the metal frame. One end of the antenna wiring is connected to the feed point, and the other end of the antenna wiring is connected to the tuning module. The connection of the antenna wiring and the tuning module is equivalent to addition of an impedance-adjustable parallel circuit at the feed point.

14 Claims, 3 Drawing Sheets

(56) References Cited

U.S. PATENT DOCUMENTS

| | | | | |
|---|---|---|---|---|
| 2021/0066786 | A1* | 3/2021 | Yarga | H01Q 1/243 |
| 2021/0066799 | A1* | 3/2021 | Avser | H01Q 5/25 |
| 2021/0175625 | A1* | 6/2021 | Guo | H01Q 5/335 |

FOREIGN PATENT DOCUMENTS

| | | | |
|---|---|---|---|
| CN | 105917527 | A | 8/2016 |
| CN | 105932408 | A | 9/2016 |
| CN | 205723955 | U | 11/2016 |
| CN | 107403996 | A | 11/2017 |
| CN | 208299054 | U | 12/2018 |
| CN | 109638455 | A | 4/2019 |
| CN | 109888461 | A | 6/2019 |
| CN | 111029729 | A | 4/2020 |
| EP | 3273533 | A1 | 1/2018 |

OTHER PUBLICATIONS

Written Opinion of the International Search Authority in International application No. PCT/CN2020/135454,mailed on Jul. 26, 2021.

1st Office Action issued in corresponding Chinese Patent Application No. 202011364945.3 dated Jun. 24, 2021, pp. 1-8.

2nd Office Action issued in corresponding Chinese Patent Application No. 202011364945.3 dated Dec. 22, 2021, pp. 1-5.

Notification to Grant Patent Right for Invention issued in corresponding Chinese Patent Application No. 202011364945.3 dated Mar. 10, 2022, pp. 1-4.

* cited by examiner

ANTENNA ASSEMBLY AND MOBILE TERMINAL

CROSS REFERENCE TO RELATED APPLICATIONS

This application is a US national phase application based upon an International Application No. PCT/CN2020/135454, filed on Dec. 10, 2020, which claims priority of Chinese Application No. 202011364945.3, entitled "ANTENNA ASSEMBLY AND MOBILE TERMINAL" filed on Nov. 27, 2020, the disclosure of which is incorporated herein by reference in its entirety.

FIELD OF THE INVENTION

The present disclosure relates to the field of communication technology, more particularly, to an antenna assembly and a mobile terminal.

BACKGROUND

In the field of mobile communication, as an important part of wireless signal transmission and reception links, the performance of antennas plays a crucial role in the communication ability of a mobile communication device. The combination configuration of metal frames and the full screen has become a major trend in mobile communication devices nowadays. In addition to the characteristics of small size, high integration, and mobility, modern communication devices also have higher requirements for the industrial design of products to make their appearance more beautiful. Therefore, using built-in antennas is the most in line with the trend of wireless application design. However, it is precisely due to the small size and high integration of communication devices that the space range for antenna installation is narrow and the required clearance area for the antenna is insufficient, which makes the antenna susceptible to interference from surrounding circuits. In addition, the current communication equipment supporting 5G (5th generation mobile networks, 5th generation wireless systems) technology on the market is also compatible with 2/3/4G functions, which makes the available space for the antenna inside the communication equipment less and less, which also leads to a very limited frequency band and bandwidth that the antenna can support.

SUMMARY

Technical Problem

The purpose of the present disclosure is to provide an antenna assembly and a mobile terminal that can support more frequency bands and wider bandwidth.

Technical Solution

One embodiment of the present disclosure is directed to an antenna assembly and a mobile terminal that can support more frequency bands and wider bandwidth.

One embodiment of the present disclosure is directed to an antenna assembly which comprises a metal frame, a matching circuit, an antenna wiring, and a tuning circuit.

The metal frame is equipped with a feed point, and the matching circuit is connected to the feed point disposed on the metal frame.

One end of the antenna wiring is connected to the feed point, and the other end of the antenna wiring is connected to the tuning circuit.

In some embodiments of the present disclosure, the antenna wiring is spaced at a predetermined distance from the metal frame.

In some embodiments of the present disclosure, the antenna assembly further comprises a wiring support.

The antenna wiring is disposed on the wiring support.

In some embodiments of the present disclosure, the antenna wiring is an LDS antenna or an FPC antenna.

The wiring support is an antenna bracket or a printed circuit board.

In some embodiments of the present disclosure, the tuning circuit is further connected to the metal frame.

In some embodiments of the present disclosure, the metal frame is further provided with a grounding point.

the metal frame is further provided with a connection point disposed between the tuning circuit and the metal frame is located between the grounding point and the feed point.

In some embodiments of the present disclosure, the metal frame comprises a first metal frame, a second metal frame, and a third metal frame.

One end of the first metal frame is connected to the second metal frame.

The other end of the first metal frame is connected to the third metal frame.

The feed point is located on the first metal frame near a position of the second metal frame.

The grounding point is located on the first metal frame near a position of the third metal frame.

In some embodiments of the present disclosure, the tuning circuit comprises a switching switch and an RLC circuit.

The RLC circuit comprises a plurality of shunts.

A fixed end of the switching switch is connected to the antenna wiring.

A plurality of switching ends of the switching switch are correspondingly connected to one end of the shunts, and the other end of the shunts is grounded.

In some embodiments of the present disclosure, the matching circuit comprises a first resistor, a second resistor, a third resistor, and a fourth resistor.

One end of the first resistor is connected to a power supply, the other end of the first resistor is connected to one end of the second resistor, and the other end of the second resistor is connected to the antenna wiring.

One end of the fourth resistor is connected to a connection point disposed between the first resistor and the second resistor, and the other end of the fourth resistor is grounded.

One end of the third resistor is connected to the antenna wiring, and the other end of the third resistor is grounded.

In some embodiments of the present disclosure, the antenna wiring are arranged parallel or inclined relative to the metal frame.

In some embodiments of the present disclosure, the first metal frame, the second metal frame, and the third metal frame are located on the same plane.

Another embodiment of the present disclosure is directed to a mobile terminal that comprising an antenna assembly. The antenna assembly comprises a metal frame, a matching circuit, an antenna wiring, and a tuning circuit.

The metal frame is equipped with a feed point, and the matching circuit is connected to the feed point disposed on the metal frame.

One end of the antenna wiring is connected to the feed point, and the other end of the antenna wiring is connected to the tuning circuit.

In some embodiments of the present disclosure, the antenna wiring is spaced at a predetermined distance from the metal frame.

In some embodiments of the present disclosure, the antenna assembly further comprises a wiring support.

The antenna wiring is disposed on the wiring support.

In some embodiments of the present disclosure, the antenna wiring is an LDS antenna or an FPC antenna.

The wiring support is an antenna bracket or a printed circuit board.

In some embodiments of the present disclosure, the tuning circuit is further connected to the metal frame.

In some embodiments of the present disclosure, the metal frame is further provided with a grounding point.

the metal frame is further provided with a connection point disposed between the tuning circuit and the metal frame is located between the grounding point and the feed point.

In some embodiments of the present disclosure, the metal frame comprises a first metal frame, a second metal frame, and a third metal frame.

One end of the first metal frame is connected to the second metal frame.

The other end of the first metal frame is connected to the third metal frame.

The feed point is located on the first metal frame near a position of the second metal frame.

The grounding point is located on the first metal frame near a position of the third metal frame.

In some embodiments of the present disclosure, the tuning circuit comprises a switching switch and an RLC circuit.

The RLC circuit comprises a plurality of shunts.

A fixed end of the switching switch is connected to the antenna wiring.

A plurality of switching ends of the switching switch are correspondingly connected to one end of the shunts, and the other end of the shunts is grounded.

In some embodiments of the present disclosure, the mobile terminal further includes a middle frame.

The grounding point on the metal frame of the antenna assembly is connected to the middle frame.

Advantageous Effect

The antenna assembly and the mobile terminal of the present disclosure can be equipped with a feed point disposed on a metal frame, and a matching circuit is connected to the feed point on the metal frame. One end of an antenna wiring is connected to the feed point, and the other end of the antenna wiring is connected to a tuning circuit. By setting the antenna wiring between the tuning circuit and the matching circuit, the antenna wiring is shunted to the metal frame, which is equivalent to shortening the current flow distance between the tuning circuit and the feed point, thereby improving the antenna tuning range and bandwidth width. At the same time, the connection between the antenna wiring and the tuning circuit is equivalent to adding a parallel circuit with adjustable impedance at the feed point, which plays a role in impedance tuning, thereby reducing antenna return loss and improving the resonant frequency range of the antenna while ensuring the transmission efficiency of the circuit.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

Figure 1:
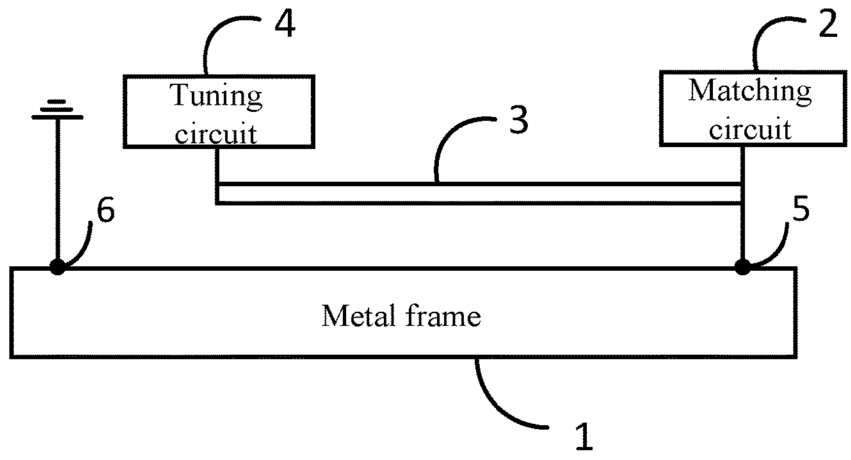
FIG. 1 is a structural schematic diagram of an antenna assembly according to one embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counterclockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure herein provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

FIG. 1 is a structural schematic diagram of an antenna assembly according to one embodiment of the present disclosure. The antenna assembly comprises a metal frame 1, a matching circuit 2, an antenna wiring 3, and a tuning circuit 4. The metal frame 1 is equipped with a feed point 5, the matching circuit 2 is connected to the feed point 5 disposed on the metal frame 1. One end of the antenna wiring 3 is connected to the feed point 5, and the other end of the antenna wiring 3 is connected to the tuning circuit 4.

The metal frame 1 is also equipped with a grounding point 6. The grounding point 6 and the feed point 5 may be arranged near both ends of the metal frame 1, respectively. The tuning circuit 4 is arranged between the grounding point 6 and the feed point 5. The antenna generates resonance between the metal frame 1 and the grounding point 6.

By setting the antenna wiring 3 between the tuning circuit 4 and the matching circuit 2, the antenna wiring 3 is shunted to the metal frame 1, which effectively shortens the current flow distance between the tuning circuit 4 and the feed point 5, thereby improving the antenna tuning range and bandwidth width. At the same time, the connection between the antenna wiring 3 and the tuning circuit 4 is equivalent to adding a parallel circuit with adjustable impedance at the feed point 5, which plays a role in impedance tuning, thereby reducing antenna return loss and improving the resonant frequency range of the antenna while ensuring the transmission efficiency of the circuit.

Figure 2:
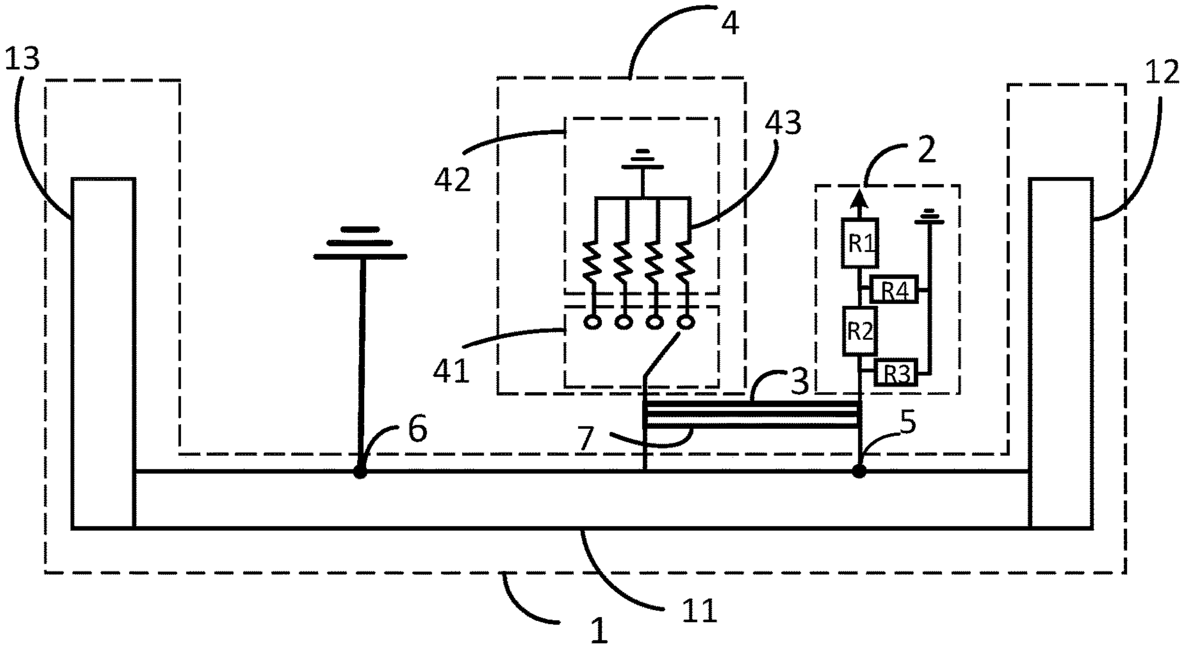
FIG. 2 is another structural schematic diagram of the antenna assembly according to one embodiment of the present disclosure.

FIG. 2 is another structural schematic diagram of an antenna assembly according to one embodiment of the present disclosure. The metal frame 1 comprises a first metal frame 11, a second metal frame 12, and a third metal frame 13.

Specifically, one end of the first metal frame 11 is connected to the second metal frame 12, and the other end of the first metal frame 11 is connected to the third metal frame 13.

For example, a connection position of the metal frame 1 in FIG. 2 is: a position of the first metal frame 11 is perpendicular to the second metal frame 12 and the third metal frame 13, and the first metal frame 11, the second metal frame 12, and the third metal frame 13 are in the same plane, while the second metal frame 12 and the third metal frame 13 are on the same side of the first metal frame 11. It should be pointed out that the specific implementation method should not be limited to this position connection form. When the antenna assembly is applied to a mobile terminal, the metal frame 1 refers to a metal frame of the mobile terminal, and a top metal frame in a pure metal frame or an injection molded metal frame is used as the metal frame 1.

Furthermore, to ensure the working efficiency of the antenna assembly, a preferred length range of the first metal frame 11, the second metal frame 12, and the third metal frame 13 is 30-100 mm.

A preset distance between the antenna wiring 3 and the first metal frame 11 may be set parallel or inclined to the position of the antenna wiring 3 and the first metal frame 11. When a position of the antenna wiring 3 and a position of the first metal frame 11 are set inclined, the shortest and longest distance between the two must be within the preset distance range. When the distance between the antenna wiring 3 and the first metal frame 11 is less than 1 mm, signal interference may occur between the antenna wiring 3 and the first metal frame 11 due to the close distance, which affects the working efficiency of the antenna assembly. When the distance between the antenna wiring 3 and the first metal frame 11 is greater than 20 mm, the distance between the antenna wiring 3 and other components inside the communication equipment is too close, which can easily limit the placement space of other components and even cause signal interference. After testing, it is found that the optimal preset distance range between the antenna wiring 3 and the first metal frame 11 is 1-20 mm.

Furthermore, as shown in FIG. 2, the antenna assembly further comprises a wiring support 7, and the antenna wiring 3 is disposed on the wiring support 7.

The antenna wiring 3 may be a laser direct structuring (LDS) antenna or a flexible printed circuit (FPC) antenna, and the wiring support 7 may be an antenna bracket or a printed circuit board. The LDS antenna may be directly formed by laser technology on the antenna bracket, or the FPC antenna may be fixed on the antenna bracket. When the selected wiring support 7 is a printed circuit board, to prevent signal interference from the printed circuit board on the antenna wiring 3, which should be set within the clearance area on the printed circuit board.

Furthermore, as shown in FIG. 2, the tuning circuit 4 comprises a switching switch 41 and an RLC tuned circuit 42.

Specifically, the RLC tuned circuit 42 comprises a plurality of shunts 43, and a fixed end of the switching switch 41 is connected to one end of the antenna wiring 3. A plurality of switching ends of the switching switch 41 are correspondingly connected to one end of the shunts 43, and the other end of the shunts 43 is grounded.

The shunts 43 of the RLC tuned circuit 42 are equipped with a number of resistors, inductors, and capacitors. The resistance, inductance, and/or capacitance values of each of the shunts 43 are different. The switching switch 41 can be connected to different shunts 43 according to the actual working requirements, so as to change the parameters of the access circuit, thereby achieving the effect of changing the antenna resonant frequency. Each of the shunts 43 comprises an inductance, and an inductance values in each of the shunts 43 are different.

Furthermore, as shown in FIG. 2, the first metal frame 11 is further provided with a grounding point 6. The tuning circuit 4 is connected to the first metal frame 11 in the metal frame 1. A connection point disposed between the tuning circuit 4 and the first metal frame 11 is located between the grounding point 6 and the feed point 5, that is, the tuning circuit 4 is set between the grounding point 6 and the feed point 5. At the same time, to prevent antenna performance from being affected, the position of the tuning circuit 4 cannot be too close to the grounding point 6 or the matching circuit 2.

When the tuning circuit 4 is not connected to the first metal frame 11, the second metal frame 12, the first metal frame 11, and the grounding point 6 are the paths that generate resonance. After the tuning circuit 4 is connected to the first metal frame 11, most of the current flowing through the first metal frame 11 will flow to the tuning circuit 4. At this time, the second metal frame 12, the first metal frame 11, and the tuning circuit 4 are the paths for generating resonance, which means that the length of the resonance is changed through aperture tuning. At the same time, the connection between the tuning circuit 4 and the antenna wiring 3 is equivalent to adding a parallel circuit with adjustable impedance at the feed point 5, which plays a role in impedance tuning. When tuning circuit 4 is connected to the first metal frame 11, aperture tuning and impedance tuning work together to further improve the resonant frequency range of the antenna.

The feed point 5 is located near the second metal frame 12 on the first metal frame 11. The grounding point 6 is located near the third metal frame 13 on the first metal frame 11.

One end of the matching circuit 2 is connected to the feed point 5 on the metal frame 1, and the other end of the matching circuit 2 is connected to the power supply. When the antenna assembly is in a working state, the matching circuit 2 transmits current to the metal frame 1. During this transmission process, the matching circuit 2 may change the impedance size in the circuit, thereby expanding the antenna bandwidth.

The matching circuit 2 is equipped with a first resistor R1, a second resistor R2, a third resistor R3, and a fourth resistor R4. One end of the first resistor R1 is connected to a power supply, the other end of the first resistor is connected to one end of the second resistor R2, and the other end of the second resistor R2 is connected to the antenna wiring 3. One end of the fourth resistor R4 is connected to a connection point disposed between the first resistor R1 and the second resistor R2, and the other end is grounded. One end of the third resistor R3 is connected to antenna line 3, and the other end is grounded.

In existing technology, a tuning circuit and a matching circuit are usually connected at different positions on a metal frame, and the two are not connected through other antenna wiring. It is likely that the impedance matching effect achieved only through the matching circuit is not ideal, which leads to impedance mismatch and echo loss during antenna operation, thereby affecting the signal transmission efficiency.

Return loss, also known as reflection loss, is the reflection of the cable link due to impedance mismatch, resulting in signal confusion. Return loss is usually caused by the non-uniformity of the characteristic impedance of the cable length, which is ultimately caused by the non-uniformity of the cable structure. Due to the reflection caused by signals at different locations in the cable, the signal arriving at the receiving end is equivalent to the multipath effect in wireless channel propagation, resulting in time diffusion and frequency selective fading of the signal. Time diffusion leads to pulse broadening, making the receiving end signal pulse overlap and unable to be determined. The multiple reflections of signals in the cable also lead to attenuation of signal power, affecting the signal-to-noise ratio of the receiving end, leading to an increase in error rate, and ultimately limiting the transmission speed of the signal.

Impedance matching is a necessary consideration in electromagnetic wave transmission circuits. Only by matching the output impedance with the load impedance can the non-reflective transmission of electromagnetic wave signals be achieved, achieving maximum power utilization. If there is a mismatch in the electromagnetic wave transmission circuit, it will cause serious reflection, which will form standing waves on the transmission line, wasting a large amount of power on the reflected power. At the same time, it will also cause damage to components due to excessive reflected power, leading to an increase in transmitter failure rate and a decrease in energy utilization. In severe cases, it may even cause antenna assembly to malfunction.

In one embodiment of the present disclosure, the connection between the switching switch 41 and the tuning circuit 4 with a plurality of shunts 43 in the RLC tuned circuit 42, which is equivalent to adding a parallel circuit with adjustable impedance at the position of the feed point 5, playing the role in impedance tuning, thereby reducing antenna return loss and improving the resonant frequency range of the antenna while ensuring the transmission efficiency of the circuit.

As shown in FIG. 2, when the switching switch 41 is connected to a plurality of shunts 43 in the RLC tuned circuit 42, the antenna wiring 3 and the first metal frame 11 both receive current signals, that is, the antenna wiring 3 and the first metal frame 11 divide the current into two branches, which is equivalent to shortening the flow distance of current between the tuning circuit 4 and the feed point 5, thus improving the resonant frequency range of the antenna.

Figure 3:
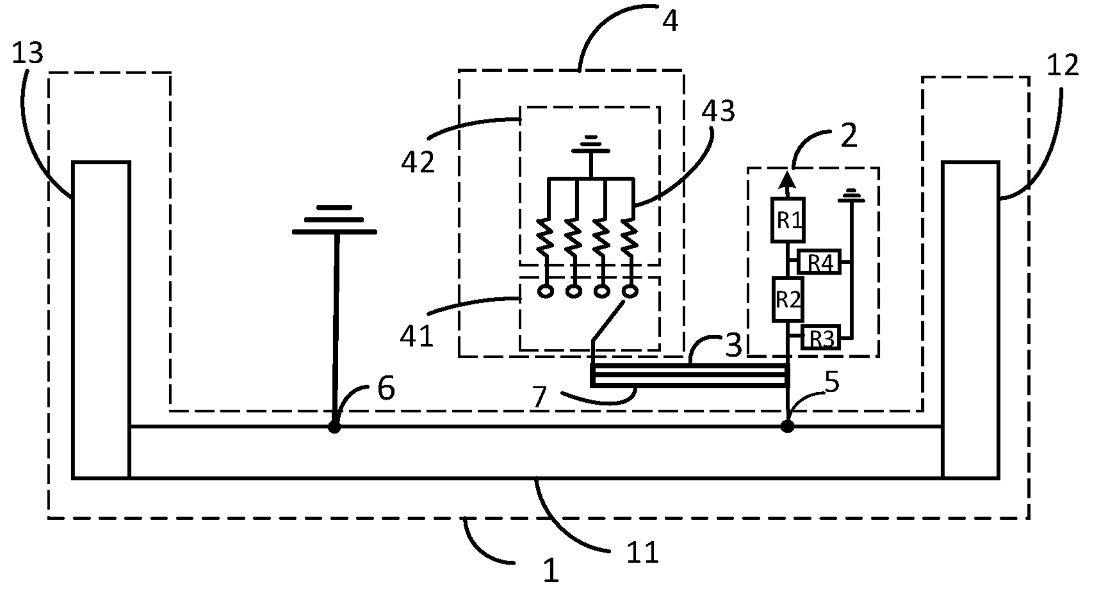
FIG. 3 is another structural schematic diagram of the antenna assembly according to one embodiment of the present disclosure.

FIG. 3 is another structural schematic diagram of the antenna assembly according to one embodiment of the present disclosure. Considering the practical application scenario, the difference between this embodiment and the embodiment in FIG. 2 is that the tuning circuit 4 is not connected to the first metal frame 11. At this time, the connection between the tuning circuit 4 and the antenna wiring 3 is equivalent to adding a parallel circuit with adjustable impedance at the feed point 5, which plays a role in impedance tuning, thereby improving the resonant frequency range of the antenna. At the same time, a position of the tuning circuit 4 may be moderately moved within the preset range. Therefore, the position of the tuning circuit 4 may be adjusted appropriately according to the actual situation, thereby greatly improving the limited range of placement space for other devices in the communication equipment and avoiding mutual interference between other devices, antenna assembly, and other devices in practical applications.

Figure 4:
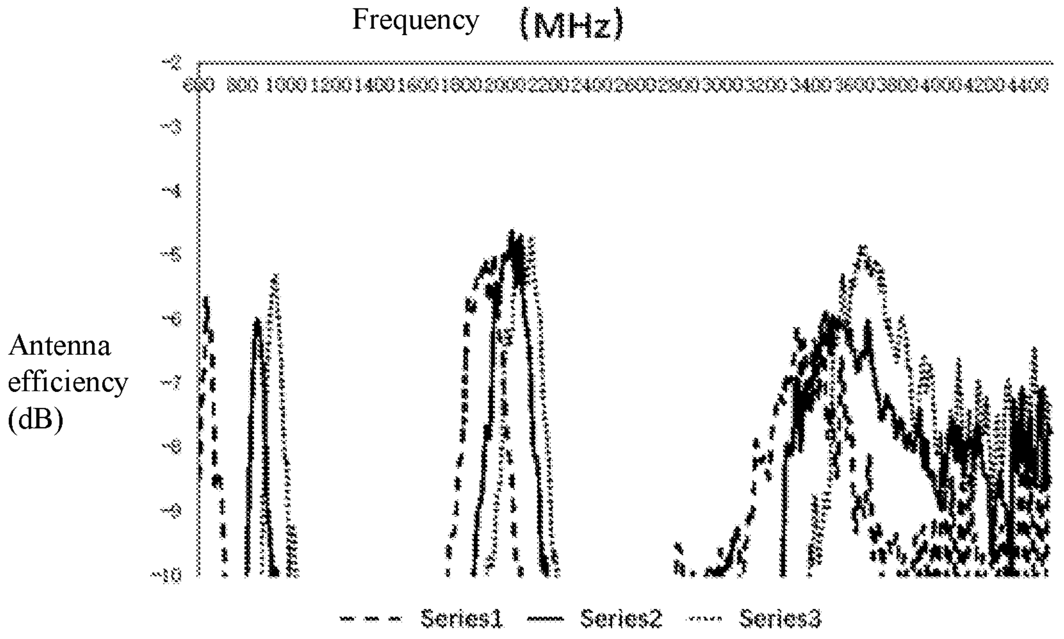
FIG. 4 shows an antenna efficiency diagram of the antenna assembly according to one embodiment of the present disclosure.

Conduct actual testing on the antenna assembly provided in the embodiment of the present disclosure, as shown in FIG. 4, which shows an antenna efficiency diagram of the antenna assembly according to one embodiment of the present disclosure.

The antenna efficiency shown in FIG. 4 refers to the ratio of the power radiated by the antenna (i.e. the power that effectively converts electromagnetic waves) to the active power input to the antenna, in decibels (dB). In order to understand the technical effect of this embodiment of the present disclosure more intuitively, the inductance value of the access circuit is changed by changing the shunts 43 in the RLC circuit connected to the switching switch 41, and the actual test is carried out.

For example, when the switching switch 41 is connected to a first shunt of the RLC tuned circuit 42, the inductance value in the first shunt is 100 nH, that is, the inductance value accessed by the tuning circuit 4 is 100 nH. At this time, the antenna generates three resonances, in which the low-frequency efficiency peak value is −5.5 dB, the high-frequency efficiency peak value is −5 dB, and the ultra-high frequency efficiency peak value is −6 dB.

When the switching switch 41 is connected to a second shunt of the RLC tuned circuit 42, the inductance value in the second shunt is 12 nH, that is, the inductance value accessed by the tuning circuit 4 is 12 nH. At this time, the antenna generates three resonances, in which the low-frequency efficiency peak is −6 dB, the high-frequency efficiency peak is −4.5 dB, and the ultra-high frequency efficiency peak is −6 dB.

When the switching switch 41 is connected to a third shunt of the RLC tuned circuit 42, the inductance value in the third shunt is 6.8 nH, that is, the inductance value accessed by the tuning circuit 4 is 6.8 nH. At this time, the antenna generates three resonances, in which the low-frequency efficiency peak is −5.2 dB, the high-frequency efficiency peak is −4.5 dB, and the ultra-high frequency efficiency peak is −5 dB.

As shown in FIG. 4, Series 1 represents the three resonances generated by the antenna when the inductance value is 100 nH, Series 2 represents the three resonances generated by the antenna when the inductance value is 12 nH, and Series 3 represents the three resonances generated by the antenna when the inductance value is 6.8 nH. Specifically, as shown in FIG. 4, the three resonances generated by each of the embodiments of the present disclosure from left to right are low-frequency resonance, high-frequency resonance, and ultra-high frequency resonance.

From this, it may be seen that the coverage range of each type of resonance is:

The frequency coverage range of the low-frequency band is 600-1200 MHz. The frequency coverage range of the high-frequency band is 1800-2200 MHz. The frequency coverage range of the ultra-high frequency band is 3300-4200 MHz. From this, it can be seen that the implementation example of the present disclosure has increased the frequency coverage range of various frequency bands, with a significant increase in the frequency coverage range of the low frequency band (from 700-1000 MHz to 600-1200 MHz, which can be achieved by existing technology).

An antenna assembly according to one embodiment of the present disclosure may set a feed point on a metal frame, and a matching circuit is connected to the feed point on the metal frame. One end of an antenna wiring is connected to the feed point, and the other end of the antenna wiring is connected to a tuning circuit. By setting the antenna wiring between the tuning circuit and the matching circuit, the antenna wiring is shunted to the metal frame, which is equivalent to shortening the current flow distance between the tuning circuit and the feed point, thereby improving the antenna tuning range and bandwidth width. At the same time, the connection between the antenna wiring and the tuning circuit is equivalent to adding a parallel circuit with adjustable impedance at the feed point, which plays a role in impedance tuning, thereby reducing antenna return loss and improving the resonant frequency range of the antenna while ensuring the transmission efficiency of the circuit.

Figure 5:
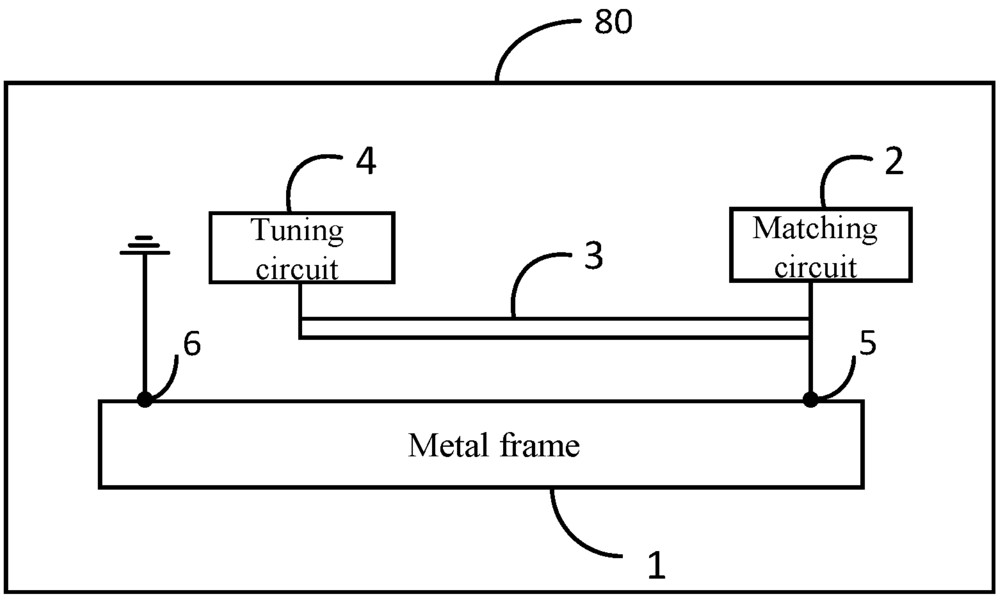
FIG. 5 is a structural schematic diagram of a mobile terminal according to one embodiment of the present disclosure.

One embodiment of the present disclosure is also directed to a mobile terminal, as shown in FIG. 5, which is a structural schematic diagram of a mobile terminal according to one embodiment of the present disclosure. The mobile terminal 80 comprises an antenna assembly in the above embodiments of the present disclosure. The antenna assembly comprises a metal frame 1, a matching circuit 2, an antenna wiring 3, and a tuning circuit 4. The metal frame 1 is equipped with a feed point, and the matching circuit 2 is connected to the feed point 5 disposed on the metal frame 1. One end of the antenna wiring 3 is connected to the feed point 5, and the other end of the antenna wiring 3 is connected to the tuning circuit 4.

The mobile terminal 80 also comprises a casing, which forms a accommodating space, and the antenna assembly are set in the accommodating space, and are close to the top or bottom area of the mobile terminal.

A preset distance disposed between the antenna wiring and the metal frame. The purpose of setting the preset distance is to avoid signal interference caused by the close distance between the antenna wiring and the metal frame when the antenna assembly is in working condition, which will affect the working efficiency of the antenna assembly. Alternatively, due to the distance disposed between the antenna wiring and the metal frame being too far, the antenna wiring may be too close to other components inside the communication equipment, resulting in limited placement space for other components and even causing signal interference.

The antenna assembly also comprise a wiring support. The antenna wiring is arranged on the wiring support.

In some embodiments of the present disclosure, the antenna wiring is an LDS antenna or an FPC antenna. The LDS antennas are formed by laser direct construction technology, which uses a computer to control the movement of the laser according to the trajectory of conductive patterns. The laser is projected onto the formed an antenna bracket, and then laser technology is used to directly deposit metal antennas on the antenna bracket. The FPC antennas are composed of printed circuit diagrams and module materials. The FPC antennas are generally used for built-in applications, such as Internet of Things (IoT) routers, circuit board network cards, etc. The thickness is 0.1 mm and they are in a square or rectangular state. The tin welding position is determined according to the actual application requirements, usually in the middle or bottom left corner, and the tail is usually an IPEX terminal or a peeled tin welding interface. The size and length of the wire may be customized according to the actual situation.

The wiring support is an antenna bracket or a printed circuit board.

A common material for the antenna brackets is usually molded three-dimensional plastic, while the common raw materials for printed circuit boards are electric wooden boards, fiberglass boards, and various types of plastic boards. To prevent signal interference from the printed circuit board to the antenna wiring, the antenna wiring should be set within the clear space area on the printed circuit board.

In some embodiments of the present disclosure, the tuning circuit is also connected to the metal frame. Furthermore, considering the issue of limited placement space for internal devices in communication devices in practical applications, the tuning circuit and the metal frame may not be connected, allowing for appropriate adjustment of the position of the tuning circuit within a predetermined range, thereby avoiding interference between signals between devices in practical applications.

In some embodiments of the present disclosure, the metal frame is also provided with a grounding point.

A connection point disposed between the tuning circuit and the metal frame is located between the grounding point and the feed point.

In some embodiments of the present disclosure, the metal frame comprises a first metal frame, a second metal frame, and a third metal frame.

One end of the first metal frame is connected to the second metal frame.

The other end of the first metal frame is connected to the third metal frame.

The feed point is located on the first metal frame near the position of the second metal frame.

The grounding point is located on the first metal frame near the third metal frame.

The tuning circuit comprises a switching switch and an RLC circuit.

The RLC tuned circuit 42 comprises a plurality of shunts 43. The RLC tuned circuit 42 is a circuit having resistors, inductors, and capacitors. The resistance, inductance, and/or capacitance values of each of the shunts are different. According to the actual working requirements, the switching switch 41 can be connected to different shunts to change the parameters of the access circuit, thereby achieving the effect of changing the antenna resonant frequency.

A fixed end of the switching switch is connected to the antenna wiring.

A plurality of switching ends of the switching switch are correspondingly connected to one end of each of the shunts, and the other end of the shunts is grounded.

One embodiment of the present disclosure is also directed to a mobile terminal, which comprises the antenna assemblies mentioned above.

In some embodiments of the present disclosure, the mobile terminal comprises a middle frame.

A grounding point on the metal frame of the antenna assembly is connected to the middle frame. Among them, the material of the middle frame is usually steel aluminum alloy.

The mobile terminal according to this embodiment of the present disclosure is capable of setting a feed point on a metal frame, connecting the matching circuit to the feed point on the metal frame, connecting one end of the antenna wiring to the feed point, and connecting the other end of the antenna wiring to the tuning circuit. By setting the antenna wiring between the tuning circuit and the matching circuit, the antenna wiring is shunted to the metal frame, which is equivalent to shortening the current flow distance between the tuning circuit and the feed point, thereby improving the antenna tuning range and bandwidth width. At the same time, the connection between the antenna wiring and the tuning circuit is equivalent to adding a parallel circuit with adjustable impedance at the feed point, which plays a role in impedance tuning, thereby reducing antenna return loss and improving the resonant frequency range of the antenna while ensuring the transmission efficiency of the circuit.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. An antenna assembly, comprising:

a metal frame, provided with a feed point;

a matching circuit, connected to the feed point disposed on the metal frame;

a tuning circuit; and an antenna wiring, connected between the feed point and the tuning circuit;

wherein the antenna wiring is spaced at a predetermined distance from the metal frame, the metal frame is further provided with a grounding point, the tuning circuit is disposed between the grounding point and the feed point, when the tuning circuit is not connected to the metal frame, the metal frame and the grounding point form a first resonance path, when the tuning circuit is connected to the metal frame, the metal frame and the tuning circuit form a second resonance path different from the first resonance path;

wherein the tuning circuit comprises a switching switch and a resistor-inductor-capacitor (RLC) circuit; the RLC circuit comprises a plurality of shunts; a fixed end of the switching switch is connected to the antenna wiring; a plurality of switching ends of the switching switch are correspondingly connected to one end of the shunts, and the other end of the shunts is grounded; the metal frame comprises a first metal frame, a second metal frame connected to the first metal frame, and a third metal frame connected to the first metal frame, wherein the feed point is located on a portion of the first metal frame adjacent to a connection region between the first metal frame and the second metal frame, and the grounding point is located on a portion of the first metal frame adjacent to a connection region between the first metal frame and the third metal frame, such that the first resonance path and the second resonance path are formed through different portions of the metal frame;

wherein the antenna wiring is configured to provide a shunt current path to the metal frame such that a current flowing from the feed point is divided into a first current flowing through the metal frame and a second current flowing through the antenna wiring, thereby shortening a current flow distance between the tuning circuit and the feed point;

wherein, when the tuning circuit is connected to the metal frame, the second resonance path is formed by redirecting a majority of the current from the metal frame to the tuning circuit, such that an effective resonance length of the antenna assembly is changed through aperture tuning;

wherein the antenna assembly is configured to simultaneously perform impedance tuning via the tuning circuit and aperture tuning via the changed current flow path.

2. The antenna assembly as claimed in claim 1, further comprising a wiring support, wherein the antenna wiring is disposed on the wiring support.

3. The antenna assembly as claimed in claim 2, wherein the antenna wiring is a laser direct structuring (LDS) antenna or a flexible printed circuit (FPC) antenna; and the wiring support is an antenna bracket or a printed circuit board.

4. The antenna assembly as claimed in claim 1, wherein the tuning circuit is further connected to the metal frame.

5. The antenna assembly as claimed in claim 4, wherein a connection point disposed between the tuning circuit and the metal frame is located between the grounding point and the feed point.

6. The antenna assembly as claimed in claim 1, wherein the matching circuit comprises:

a first resistor, connected to a power supply;

a second resistor, connected between the first resistor and the antenna wiring;

a third resistor, connected between the antenna wiring and a ground; and a fourth resistor, connected between the second resistor and the ground.

7. The antenna assembly as claimed in claim 1, wherein the antenna wiring is arranged parallel or inclined relative to the metal frame.

8. The antenna assembly as claimed in claim 1, wherein the first metal frame, the second metal frame, and the third metal frame are located on the same plane.

9. A mobile terminal, comprising an antenna assembly, the antenna assembly comprising:

a metal frame, provided with a feed point;

a matching circuit, connected to the feed point disposed on the metal frame;

a tuning circuit; and an antenna wiring, connected between the feed point and the tuning circuit;

wherein the antenna wiring is spaced at a predetermined distance from the metal frame, the metal frame is further provided with a grounding point, the tuning circuit is disposed between the grounding point and the feed point, when the tuning circuit is not connected to the metal frame,, the metal frame and the grounding point form a first resonance path, when the tuning circuit is connected to the metal frame, the metal frame and the tuning circuit form a second resonance path different from the first resonance path;

wherein the tuning circuit comprises a switching switch and a resistor-inductor-capacitor (RLC) circuit; the RLC circuit comprises a plurality of shunts; a fixed end of the switching switch is connected to the antenna wiring; a plurality of switching ends of the switching switch are correspondingly connected to one end of the shunts, and the other end of the shunts is grounded; the metal frame comprises a first metal frame, a second metal frame connected to the first metal frame, and a third metal frame connected to the first metal frame, wherein the feed point is located on a portion of the first metal frame adjacent to a connection region between the first metal frame and the second metal frame, and the grounding point is located on a portion of the first metal frame adjacent to a connection region between the first metal frame and the third metal frame, such that the first resonance path and the second resonance path are formed through different portions of the metal frame;

wherein the antenna wiring is configured to provide a shunt current path to the metal frame such that a current flowing from the feed point is divided into a first current flowing through the metal frame and a second current flowing through the antenna wiring, thereby shortening a current flow distance between the tuning circuit and the feed point;

wherein, when the tuning circuit is connected to the metal frame, the second resonance path is formed by redirecting a majority of the current from the metal frame to the tuning circuit, such that an effective resonance length of the antenna assembly is changed through aperture tuning;

wherein the antenna assembly is configured to simultaneously perform impedance tuning via the tuning circuit and aperture tuning via the changed current flow path.

10. The mobile terminal as claimed in claim 9, wherein the antenna assembly further comprises a wiring support, and the antenna wiring is disposed on the wiring support.

11. The mobile terminal as claimed in claim 10, wherein the antenna wiring is a laser direct structuring (LDS) antenna or a flexible printed circuit (FPC) antenna; and the wiring support is an antenna bracket or a printed circuit board.

12. The mobile terminal as claimed in claim 9, wherein the tuning circuit is further connected to the metal frame.

13. The mobile terminal as claimed in claim 12, wherein a connection point disposed between the tuning circuit and the metal frame is located between the grounding point and the feed point.

14. The mobile terminal as claimed in claim 9, further comprising a middle frame wherein the grounding point on the metal frame of the antenna assembly is connected to the middle frame.

* * * * *